Figure 1:
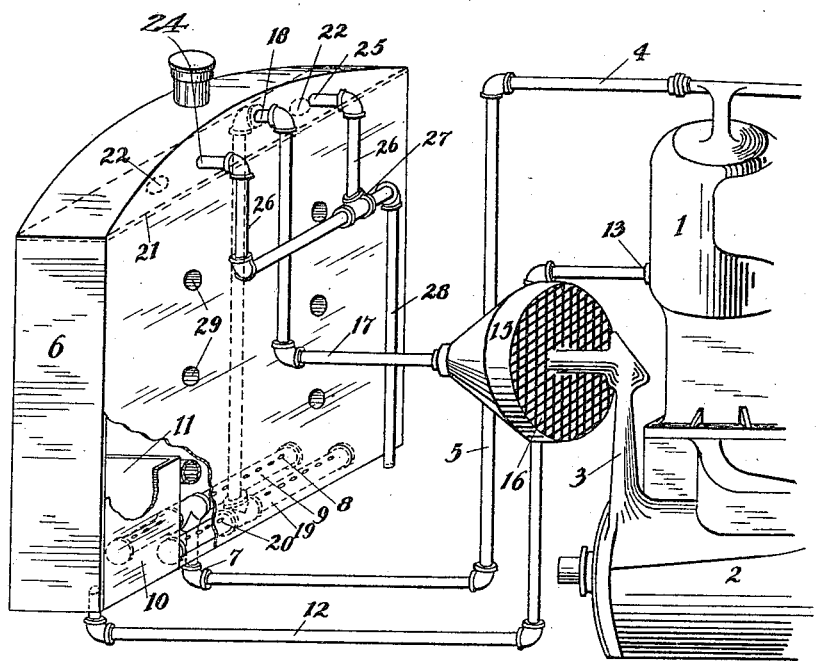

T. F. LAMB & W. L. DICKINSON.
WATER COOLER.
APPLICATION FILED OCT. 9, 1912.

1,144,940.

Patented June 29, 1915.

Witnesses
L. W. Frost
A. L. Phelps

Inventors
Thomas F. Lamb
Walter L. Dickinson
By C. Shepherd Attorney

UNITED STATES PATENT OFFICE.

THOMAS F. LAMB AND WALTER L. DICKINSON, OF SHREVEPORT, LOUISIANA.

WATER-COOLER.

1,144,940. Specification of Letters Patent. Patented June 29, 1915.

Application filed October 9, 1912. Serial No. 724,741.

*To all whom it may concern:*

Be it known that we, THOMAS F. LAMB and WALTER L. DICKINSON, citizens of the United States, residing at Shreveport, in Caddo parish and State of Louisiana, have invented certain new and useful Improvements in Water-Coolers, of which the following is a specification.

Our invention relates to water coolers and is particularly directed to that type of water cooler utilizing a heat interchange between the water and a cooling medium.

More specifically, our invention takes the form of means permitting a heat interchange between the water to be cooled and a current of air forced into and through the water body.

One object of our invention is so locating the point of entrance of the water to be cooled and the cooling air, that the greatest efficiency may be gotten. This we preferably accomplish by placing both the inlets for the air and water in the base of a water receptacle, thus allowing the air to pass upward through the body of the water to an outlet point.

Other objects are the provision of means for confining a portion of the cooled water that is free from the influence of the cooling air and also to the provision of a separate compartment in which the exhaust air may be collected and discharged after the heat interchange. The natural tendency of heated water is to rise and in this manner leaving a cooler layer of water near the base of the receptacle. To collect and deliver the uncharged water, we provide a supplemental receptacle in the base of the main receptacle.

Our invention is particularly effective when replacing the ordinary radiator of an automobile and, if desired, complete circulation through the water jacket of the automobile engine may be gotten by simply utilizing the natural tendency of the heated water above mentioned. In its application to an automobile, we provide a fan element preferably driven from the crank shaft of the engine and in this manner creating a current of air. The water receptacle can be made to take the shape of the ordinary automobile front and the current of air introduced into the bottom portion thereof. Under ordinary conditions, the tank will be filled to the desired degree and the heated water leaving the water jacket, would be made to also enter in the bottom of the tank. The differences in temperature between the heated and cool water, would ordinarily be sufficient to cause continuous and complete circulation of the water through the water jackets, but the well known type of pump, when used, would, of course, supplement this action.

Figure 2:
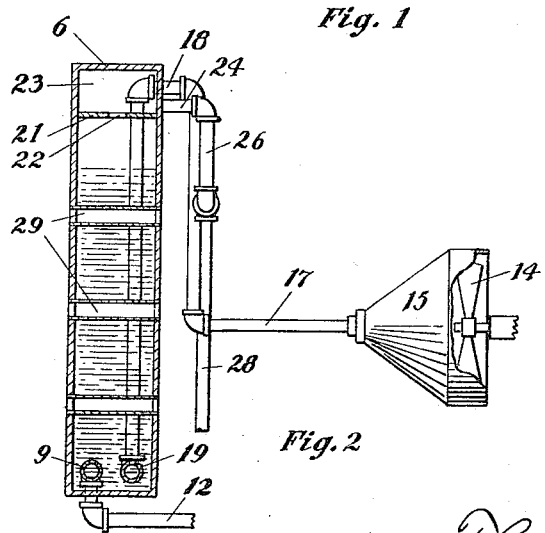

The preferred embodiment of our invention is shown in the accompanying drawing, in which similar characters of reference designate corresponding parts, and in which:

Figure 1 is a perspective view of our cooler as applied to an automobile engine, and, Fig. 2 is a detached view showing the tank in section.

In the drawings, the engine is shown as comprising a cylinder 1, crank casing 2 and carrying a rigid upright standard 3. Connected to the top of the engine cylinder 1 is an outlet pipe 4 from the water jacket and extending forwardly and downwardly as at 5 and entering through the base of the water tank 6, as indicated at 7. In the adaptation of our invention to an automobile, we preferably construct the casing 6 to conform as nearly as possible to the shape of the well known radiator since the tank is adapted to replace the same. The water entering the tank 6 is permitted to escape through apertures 8 in the pipe 9 forming the termination of the outlet pipes from the cylinders within the receptacle. In the lower left hand corner of the receptacle 6, we provide a supplemental receptacle 10 having an open top as indicated at 11. Communicating with the base of this supplemental receptacle 10 is a water pipe 12 serving as an inlet to the water jacket of the cylinders and entering the same as indicated at 13.

The standard 3 carried by the crank casing 2 serves as a bearing and support for gear mechanism, not shown, for driving a fan element 14 mounted within the casing 15 and having an open-meshwork end 16. Extending rearwardly from the casing 16 is an air pipe 17 entering the top of the receptacle 6 at 18 and continuing downwardly terminating in a T-head extension 19 apertured as at 20. The air as it is forced through the apertures 20 passes upwardly through the body of the water and collects in the upper portion of the tank 6. To prevent excessive splashing and to permit the ready escape of this air, we provide a partition 21 apertured as at 22 and forming the air exhaust chamber 23. Entering the exhaust chamber 23 at 24 and 25 are relief pipes 26 uniting as at 27 into a common pipe 28 extending downwardly any desired distance to a point remote from the working mechanism of the automobile. In order to secure a maximum cooling effect, we provide supplemental air conduits 29 extending transversely of the tank and permitting the passage of a current of air through the same and into the compartment formed by the hood of the automobile. In this manner pure air may be supplied to the fan structure.

The operation of our device is as follows: The casing 6 being normally filled as indicated in the drawing, the heated water leaves the engine cylinder and enters the base of the tank through the apertures 8 in the pipes 9 and passes upwardly to the water level. During this operation, however, the fan 14 directly driven from the crank shaft, causes a current of air to also be introduced into the bottom of the receptacle 6 through the apertures 20 in the pipes 19. The air being considerably lighter than the water, will naturally pass upward to an outlet point. The close mingling of the water and air causes a heat interchange by cooling the water and heating the air and the cooled water will naturally collect in the bottom of the tank. The water after it has been cooled and that which enters the supplemental receptacle 10 is free from the action of the cooling air and consequently cannot carry any of the cooling air into the engine cylinder. The air as it escapes after the cooling action, enters the compartment 23 through the apertures 22 in the wall 21 and passes out to the open air. It will be understood, that complete circulation of the water through the engine water jackets may be had by taking advantage of the difference in temperature of the water before and after it is cooled, but this circulating action may be supplemented by using the well known form of pump common to all water cooled internal combustion engines.

While our invention is particularly applicable to automobile engines in general, yet it is equally as applicable to water coolers in general and we have so claimed it.

It will be apparent, by reference to the above specification and drawing, that a comparatively simple structure is provided for cooling water by causing a heat interchange between this water and some cooling medium.

What we claim, is:

A water cooler comprising a receptacle, a perforated air inlet pipe in the base of said receptacle, a cool water compartment having an open top and closed sides and bottom in the base of said receptacle, the top of said compartment being above the level of said air inlet pipe, said air inlet pipe being confined to the space in the base of said receptacle not covered by said compartment, means for forcing a stream of air through said air inlet pipe, means for supplying water to said receptacle, and a water outlet pipe leading from the base of said receptacle.

In testimony whereof we affix our signatures in presence of two witnesses.

THOMAS F. LAMB.
WALTER L. DICKINSON.

Witnesses:
ABEL LABENNE,
F. E. LACAZE.

Copies of this patent may be obtained for five cents each, by addressing the "Commissioner of Patents, Washington, D. C."